Patented Jan. 16, 1951

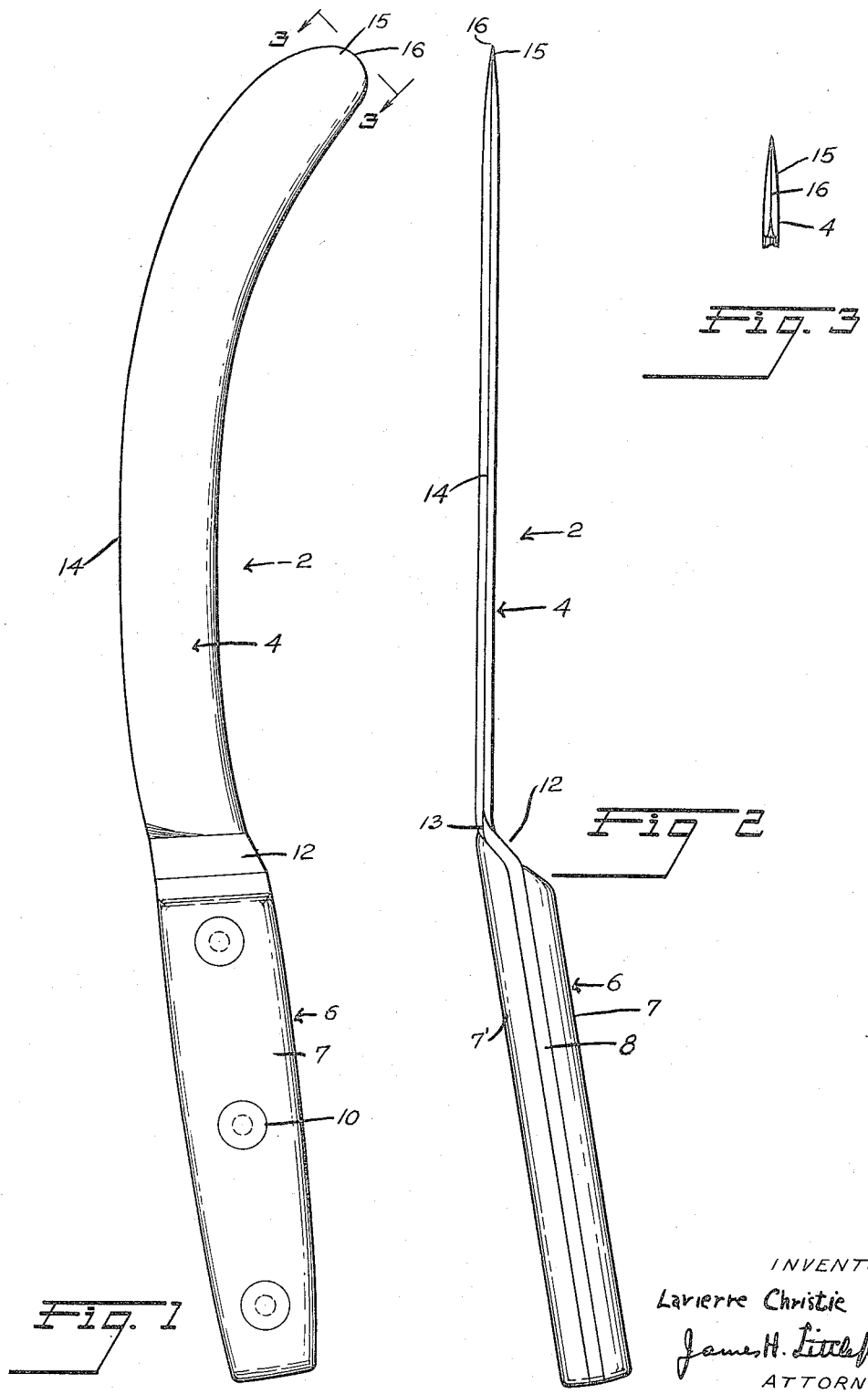

2,538,442

UNITED STATES PATENT OFFICE 2,538,442

KNIFE

Lavierre Christie, Meadville, Pa.

Application December 13, 1948, Serial No. 65,060

3 Claims. (Cl. 30—356)

This invention relates to cutlery and, more particularly, to a combined rib and slicing knife.

The primary object of this invention is to provide a knife for cutting off and trimming the ribs of a carcass and, particularly, a knife having an upswept blade laterally and angularly offset from the handle so that it can be easily worked in behind the ribs.

Another object is to provide a knife having an offset blade and an upturned, semi-scimitar-like tip with a curved edge capable of being slid in close to the bones to trim. In order to facilitate insertion of the knife, it is proposed that the curved tip edge be thin, but not pointed so as to avoid sticking in, or cutting through of the knife when inserting the tip close to a bone and between membranes.

These and other objects will be apparent from the following specification and drawing, in which:

Fig. 1 is a side elevation of the knife;

Fig. 2 is edge view of the knife; and,

Fig. 3 is a fragmentary view showing the tip of the blade as indicated at 3—3 of Fig. 1.

Referring now to the drawing, the knife, indicated generally at 2, includes a blade 4, and handle 6 conventionally formed by opposed wooden sides 7, 7' sandwiching the shank 8 of the blade between them, the handle assembly being held together by rivets 10.

Blade 14 is offset from its shank 8 by a neck 12 so that its heel 13 starts continuous with the side 7' of handle 6.

The curve of blade edge 14 is continuously convex, and rounds up to a tip 15 having very thin edge 16.

Tip 16 is upturned so as to lie above the level of handle 6 as seen in Fig. 1. Furthermore, blade 4 extends from neck 12 at such an angle with respect to handle 6 that it recrosses an imaginary straight line extended from shank 8 so that the blade may be said to be curved upwardly from the handle and to be laterally and angularly offset from the handle.

The result of the blade arrangement is that it can be easily controlled when cutting along or against ribs or other bones, and can be worked behind the bones without awkward displacement of the handle.

Additionally, the knife is useful for thin slicing in that blade 4 may be placed against the meat or other material being sliced without having to "get down" to the same level. Also, downward pressure may more easily be exerted to press the flat of the blade against the work during slicing because of its lateral and angular offset.

I claim:

1. A knife comprising a substantially flat-sided handle, and a blade extending forwardly from said handle, the cutting edge of said blade being convex and curving upwardly from the handle end thereof to a tip end, the handle end of said blade being laterally offset from the center of said handle and lying substantially flush with one of the flat sides thereof.

2. The combination claimed in claim 1, said blade also being offset from said handle at such an angle as to cross an imaginary line extended straight forwardly from said handle.

3. The combination claimed in claim 2, said tip end being rounded and lying substantially above said imaginary line.

LAVIERRE CHRISTIE.

REFERENCES CITED

The following references are of record in the file of this patent:

UNITED STATES PATENTS

| Number | Name | Date |
|---|---|---|
| 516,671 | Wedekind | Mar. 20, 1894 |
| 2,429,405 | Dringman | Oct. 21, 1947 |

FOREIGN PATENTS

| Number | Country | Date |
|---|---|---|
| 270,574 | Great Britain | May 12, 1927 |